United States Patent
Sinnhuber et al.

(10) Patent No.: US 6,276,483 B1
(45) Date of Patent: Aug. 21, 2001

(54) MOTOR VEHICLE SAFETY ARRANGEMENT

(75) Inventors: Ruprecht Sinnhuber, Gifhorn; Frank Vöge, Osnabrück; Holger Michael Thum; Ulrich Knothe, both of Braunschweig, all of (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 08/894,004

(22) PCT Filed: Jan. 18, 1996

(86) PCT No.: PCT/EP96/00188

§ 371 Date: Mar. 6, 1998

§ 102(e) Date: Mar. 6, 1998

(87) PCT Pub. No.: WO96/22903

PCT Pub. Date: Aug. 1, 1996

(30) Foreign Application Priority Data

Jan. 23, 1995 (DE) ............................................ 195 01 859

(51) Int. Cl.[7] .................................................... B60K 28/00
(52) U.S. Cl. ............................ 180/274; 24/512; 180/271; 280/748
(58) Field of Search ..................................... 280/748, 750, 280/751, 752, 779; 180/271, 282, 90, 90.6, 274; 74/512, 513

(56) References Cited

U.S. PATENT DOCUMENTS 3,856,103 12/1974 Scholz et al. .
3,988,945 11/1976 Fasano .
4,297,550 10/1981 Leighton et al. .
4,779,480 10/1988 Stocker .
4,946,195 8/1990 Ioka et al. .
5,169,172 12/1992 Dolla .
5,211,072 5/1993 Barlas et al. .
5,239,891 8/1993 Stocker .
5,327,797 7/1994 Seifrit, Jr. .
5,460,061 10/1995 Redding et al. .
5,531,135 7/1996 Dolla .
5,563,355 10/1996 Pluta et al. .
5,615,749 4/1997 Kato .
6,006,626 12/1999 Notake et al. .

FOREIGN PATENT DOCUMENTS 2151599 5/1973 (DE) .
2313115 9/1974 (DE) .

(List continued on next page.)

Primary Examiner—Eric Culbreth
(74) Attorney, Agent, or Firm—Baker Botts L.L.P.

(57) ABSTRACT

A motor vehicle safety arrangement has a pedal mechanism with at least one bearing block and at least one pedal articulated thereon. The bearing block is held by a beam member which extends approximately over the width of the vehicle and is spaced from a bulkhead delimiting the passenger compartment. In order to prevent injury to feet on frontal impact, the beam member is resistant to bending and is uncoupled from the bulkhead. The distance between the member and bulkhead is dimensioned such that, in the event of intrusion of the bulkhead as a result of a collision, the position of the beam member does not vary substantially.

25 Claims, 7 Drawing Sheets

FOREIGN PATENT DOCUMENTS

| | | |
|---|---|---|
| 2516659 | 10/1975 | (DE) . |
| 3040722 | 5/1981 | (DE) . |
| 3533420 | 3/1987 | (DE) . |
| 3904616 | 8/1989 | (DE) . |
| 3928869 | 3/1990 | (DE) . |
| 4200360 | 7/1993 | (DE) . |
| 4305290 | 9/1993 | (DE) . |
| 93 07274.0 | 9/1993 | (DE) . |
| 4335511 | 5/1994 | (DE) . |
| 92 17184.2 | 5/1994 | (DE) . |
| 4340633 | 6/1994 | (DE) . |
| 4305049 | 8/1994 | (DE) . |
| 4409235 | 10/1994 | (DE) . |
| 4409285 | 10/1994 | (DE) . |
| 4409324 | 10/1994 | (DE) . |
| 4415642 * | 12/1994 | (DE) . |
| 19515852 * | 11/1995 | (DE) . |
| 378314 * | 7/1990 | (EP) . |
| 0659615 | 12/1994 | (EP) . |
| 2031814 | 7/1980 | (GB) . |
| 2062153 | 5/1981 | (GB) . |
| 56163973 | 12/1981 | (JP) . |
| 5170065 | 7/1993 | (JP) . |
| 06211115 | 8/1994 | (JP) . |
| 9706036 | 2/1997 | (WO) . |

* cited by examiner

MOTOR VEHICLE SAFETY ARRANGEMENT

REFERENCE TO RELATED APPLICATION

This application is a Rule 371 of International Application No. PCT/EP96/00188 filed Jan. 18, 1996.

BACKGROUND OF THE INVENTION

The invention relates to a safety device for a motor vehicle.

A safety device of this kind is disclosed in DE 2,151,599 C2 (B 60 R 21/04). Inside a dashboard, a deformation element is there arranged, extending more or less rectilinearly over the entire width of the vehicle and configured as a knee-restraining member. The deformation member is at the same time utilized to back up the steering gear and/or the pedal suspension. As illustrated in more detail specifically in the parallel application U.S. Pat. No. 3,856,103, in frontal a collision, owing to the attendant bulkhead intrusion, an impact on the pedal articulation is to be reckoned with, such that the pedal will be moved towards the occupants and thus considerably endanger the lower extremities especially. More recently, designs have been disclosed that provide either a swinging of the pedal towards the bulkhead (see DE 3,904,616 A1, B 60 T 7/06) or a retraction thereof from the footnotes (see esp. DE 4,305,290 A1, B 60 K 23/00). The principle of action common to the two sources last mentioned is that the bulkhead intrusion attendant upon a head-on collision leads to a relative displacement vis-à-vis a transversely extending and substantially flexurally rigid structural beam. From this relative motion, by a certain arrangement of functional parts associated with the pedal, a swinging or shifting motion is obtained.

SUMMARY OF THE INVENTION

The object of the invention is to provide a safety device and pedal action for motor vehicles whereby the danger of injury to occupants of the vehicle may be still further reduced.

This object is accomplished by providing a vehicle with at least one pedal articulated in a bearing block and at least one beam member extending over at least about one half the width of the vehicle and rigidly connected to the vehicle superstructure and to the bearing block, wherein the pedal is articulated so that it will be mechanically uncoupled from the vehicle bulkhead upon collision-related displacement of the bulkhead.

According to the invention, then, as also in DE 3,904,616 A1 and DE 4,305,290, the structural member extending transverse to the direction of travel is rendered flexurally rigid, and moreover uncoupled from the bulkhead in such manner that it will retain its spatial location even in a head-on or "offset" collision, despite bulkhead intrusion. Otherwise than in the cited sources, however, the pedal is not arranged between the flexurally rigid beam and the bulkhead, but on the flexurally rigid beam itself. Thus the pedal, distanced from the bulkhead as a rule, at least retains its position of safety for the occupants. According to especially advantageous modifications of the invention, however, alternatively or additionally, a swinging motion can be generated by obtaining actuating forces for the swing or shift of the pedal from the displacement of the bulkhead and/or fixtures.

The articulation of the pedal directly to a beam member integral with the superstructure is known in principle from DE 3,040,722 C2 (B 60 T 7/04). Starting from a floorplate, the beam member, to be sure, is there substantially vertical, and incidentally comes so close to an outside wall that in an impact on this wall by a colliding object in an accident, the entire beam and with it the pedal articulated therein must be expected to move inward.

Especially advantageous is an extension of the flexurally rigid beam member between two bodywork columns, viz. for example between the two so-called A-columns. By this measure, the stability of the bodywork in side collisions is definitely improved as well. A further embodiment of stability can be achieved by a massive integration of the beam member with a central tongue extending down the middle of the vehicle. In addition, the beam member according to the invention may be utilized for the lower abutment of a steering column. A heightened measure of safety is further provided if the steering column is equipped with a telescoping force absorber. The forces exerted by the occupant on the steering wheel during an accident are thus reduced to a tolerable measure.

Another advantage of the concept according to the invention is to be seen in that, for example by attachment of the brake force amplifier and main brake cylinder to the beam member, the acoustics in the passenger compartment may be improved, because there is no longer a direct acoustic transmission path from the engine compartment. In a preferred embodiment, all controls such as pedal, pushrod, brake amplifier and main brake cylinder pertaining to the braking system as well as other gear to actuate power controls and coupling or steering parts are integrated into one subassembly with the beam member. Supplementarily, suspension elements for an airbag support or a knee pad may also be provided on the beam member. The knee pad may alternatively be formed by a glove compartment cover capable of abutting at least indirectly on the beam member. This will generally also reduce the assembly outlay for a motor vehicle equipped with a pedal action according to the invention. It should also be mentioned that the beam member, being uncoupled from the bulkhead, is not exposed to any high stresses, so that in its stress analysis, only the actuating forces exerted on the pedals and the dead weight of other functional parts need be considered. For this reason, the beam member is preferably made of a light metal, for example extruded aluminum. A hollow section produced in this way with closed cross section may at the same time serve as a conduit for air or liquid.

BRIEF DESCRIPTION OF THE DRAWINGS

Advantageous embodiments of the invention will now be illustrated in more detail with reference to the drawing. In schematic representation.

DESCRIPTION OF PREFERRED EMBODIMENTS

Figure 1:
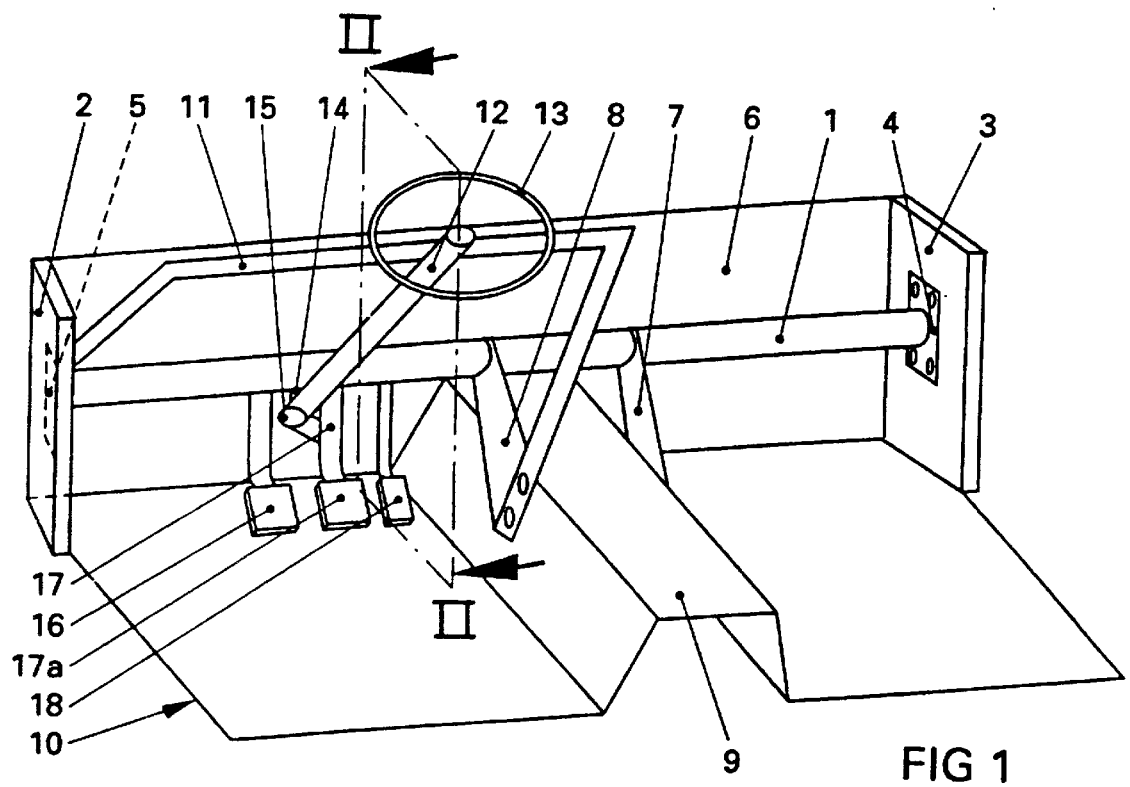
FIG. 1 shows a perspective view of the basic installation of a beam member extracting in a passenger compartment and uncoupled from a bulkhead.

In all figures, like parts bear like reference numerals.

In FIG. 1, we see a portion, no reference numeral, of a front area in a vehicle, not otherwise shown in detail. As an essential part of the invention, a tubular beam member 1 is here represented, extending beneath an unreferenced water box between a left-hand A-column 2 and a right-hand A-column 3, and secured to these by end flanges 4 and 5 with screw or plug connections. The A-columns 2, 3 typical in modern vehicle construction are members of the superstructure, which after a collision hardly change their position relative to each other or to other body portion not affected by the collision. The beam member 1 is set inward from a bulkhead 6 bounding the passenger compartment far enough so that in hard head-on collisions, preferably no contact between these parts will result or else the intrusion of the bulkhead 6 will be positively arrested by the beam member 1. Struts 7 and 8 support the midportion of the beam member 1 from a central tunnel 9, part of a floor plate generally designated 10. The strut 8 on the driver's side serves further for attachment of a steering gear frame 11, by which a steering column 12 is held in manner not shown in detail, its upper and terminated by a steering wheel 13 and its lower end connected to the beam member 1 by way of a bottom steering column bearing 14. Alternatively to attachment of the steering column 12 to the frame 11, the upper end may be mounted directly on a water box, here not shown in detail, bounding the bulkhead 6 at the top. The dimensioning of the water box is designed for collision conditions in such a way that the upper pivot remains nearly stationary. By means of an articulation 15, merely indicated schematically, the steering motion applied to the steering wheel 13 is transmitted to a steering gear, not shown in detail, associated with the running wheels of the vehicles. By the connection of the steering column 12 to the stationary beam element 1 by way of the steering column bearing 14, the steering action is rendered independent of bulkhead intrusion. In this way, the steering motion is utilized also to prepare for an occupant-restraining function.

According to an especially advantageous refinement of the invention, the mounting on the steering gear frame 11 is rendered yielding in a deliberately preassigned manner, so that in event of a collision, a defined motion of the steering column can be achieved. Because in a head-on collision the main loads from the engine compartment anterior to the bulkhead 6 are assumed by the beam member 1 as arranged according to the invention, a diminished reaction compared to a conventional mounting of the upper end of the steering column will suffice. By suitable matching with the deformation behavior of the water box, after an impact on the steering wheel 13 in an accident, the kinematics of the top articulation of the steering column 12 can be influenced in a controlled manner, especially if a deformationally fairly rigid strut connects the articulation to a stationary body part, for example the central tunnel. Preferably, the trajectory of the articulation in a collision is conceived so that the angle included between centerline of steering column and floor plate 10 is diminished in absolute value, so as to move an airbag (here not shown) installed in the steering wheel 13 into an improved restraining position vis-à-vis the occupants. The steering wheel 13 is thus moved downward in a defined member.

Essential components of the pedal action associated with the beam member 1 are a clutch pedal 16, a brake pedal 17 with footboard 17a and a gas pedal 18. The bearing member 1, being hollow with a closed cross-sectional profile, has segments which are parts of an air or liquid delivery system.

Figure 2:
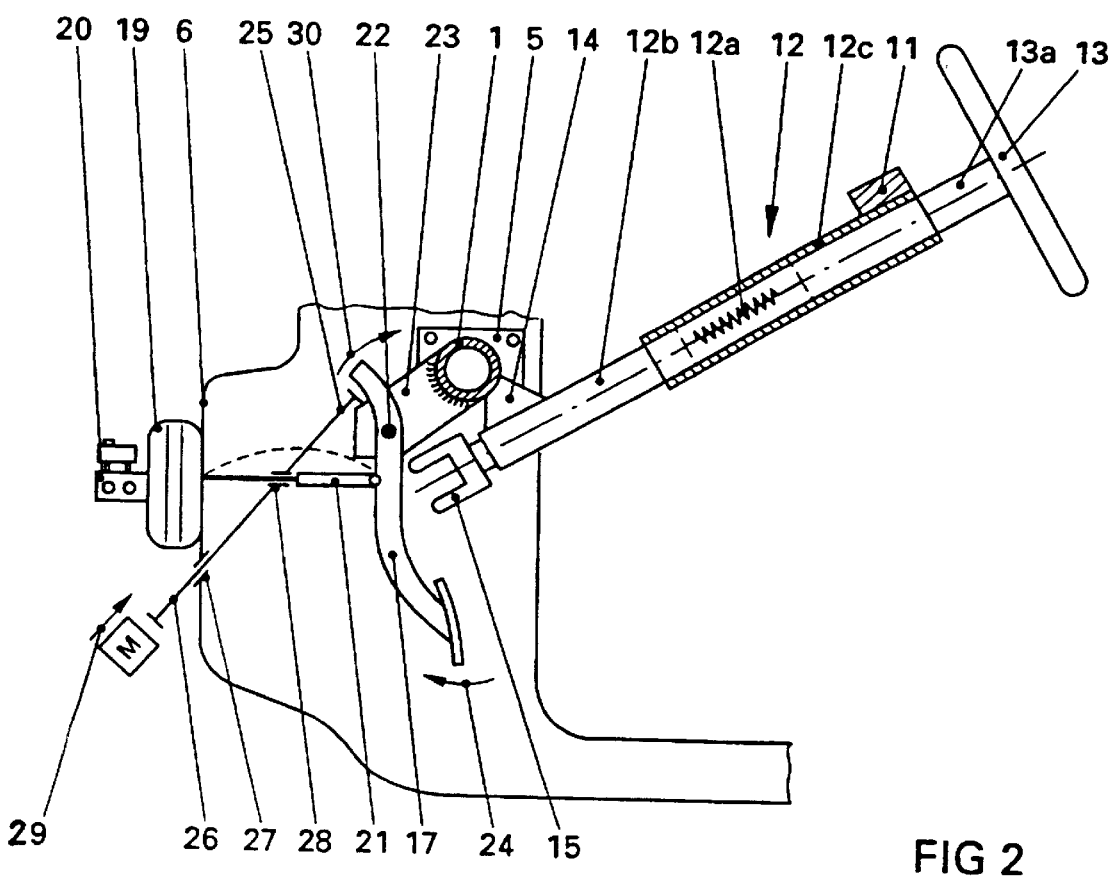
FIG. 2 shows a view at the sectional plane II—II in FIG. 1.

Beyond the area represented in FIG. 1, the steering column 12 in FIG. 2 is of telescoping construction, to wit with an integrated force absorber 12a between a bottom steering column portion 12b and a top steering column portion 12c. In the latter, a steering wheel shaft 13a is arranged bearing the energy-absorbently yielding steering wheel 13 at its upper end and abutting at its bottom end against the bottom steering column portion 12b ahead of the force absorber 12a. When the steering wheel 13 is acted upon by occupant impact in an accident, the force acting upon the occupant is transmitted to the beam member 1 and absorbed with the aid of the force absorber 12a down to an allowable maximum. Also, FIG. 2 shows a brake force amplifier 19, attached to the bulkhead 6 in the engine compartment outside of the passenger compartment together with an associated main brake cylinder 20 and capable of being acted upon by a pushrod 21 from the brake pedal 17. The latter is articulated by a pivot 22 to a bearing block 23, which in turn is rigidly connected to the beam member 1. In event of an actuation of the brake pedal 17 as indicated by the arrow 24, the brake pedal 17 will swing about the pivot 22. An upper end 25 of an actuating rod 26, to be described in more detail later on, acts as a step when the brake pedal is again held in rest position by spring action.

Now the construction of the actuating rod 26 is such that, by way of a weak spot 27, preferably in the neighborhood of the bulkhead 6, it is arranged stationary in the first instance relative to the beam member 1. The strength of the weak spot 27 is so proportioned that the function of the pedal-stop 25 is always assured in normal operation. The actuating rod 26 is also associated with a slide bearing 28 traversed by the push rod 21 associated with the brake force amplifier 19. Relative to a mass H (for example a transmission casing or an engine block) displaceable relative to the superstructure in a head-on collision, the actuating rod 26 acting as transmission member is so oriented that upon displacement of the mass M according to the arrow 29, the brake pedal 17 will be swung by the stop 25 about the pivot 22 according to the arrow 30. Additionally, the deflection of the push rod 21 into the position shown dotted also provides for a rotation of the brake pedal 17. Advantageously, the length of the actuating rod 26 is such that after the buckling of the brake push rod 21 as indicated in the drawing, the brake pedal 17 is no longer in contact with the stop 25. The positive guidance of the brake pedal 17 is relieved in this way, so that a foot that may be caught between the bulkhead 6 and the brake pedal 17 will not be crushed.

From the foregoing description, then, it will be clear that in the embodiment shown by way of example in FIG. 2, the uncoupling of beam member 1 and bulkhead 6 on the one hand, and the additionally introduced swing of the pedal system away from the occupants on the other hand, provide a multiple measure of safety against foot injuries.

Figure 3:
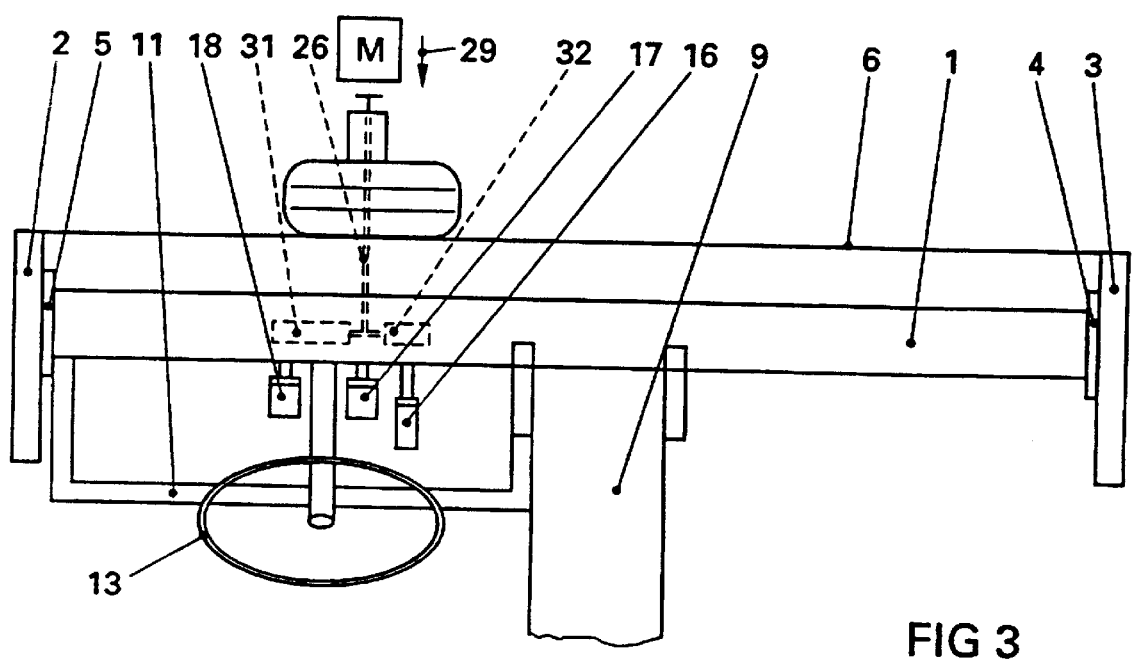
FIG. 3 shows a top view of the beam member represented in FIG. 1.

For closer illustration of the situation represented in FIG. 2, the top view in FIG. 3 shows the principle of operation of the actuating rod 26 in conjunction with the mass M and the brake pedal 17. Likewise seen are cogs 31, 32 whereby, besides the brake pedal 17, the clutch pedal 18 and the gas pedal 16 are likewise movable out of the danger zone towards the bulkhead 6 in a frontal collision.

In the embodiment illustrated by way of example in FIG. 2, the telescoping construction of the steering column 12 has the effect that upon displacement of the steering gear towards the passenger compartment, the top part of the steering column 12 attached to the frame 11 is not subjected to additional load. The location of the steering wheel 13 relative to the occupant is thus maintained.

The abutment of the beam member 1 by way of the struts 7 and 8 ensures that in a side collision, the beam element 1 cannot buckle. This measure substantially improves the resistance of the entire vehicle body to lateral impact. At the same time, the invention thus permits the adaptation of a safety concept disclosed in DE 3,928,869 A1 (B 60 E 21/100). Depending on installation conditions, separate struts 7, 8 may sometimes be dispensed with, in which case for example the beam member 1 may be attached directly to the central tunnel. Another modification may consist in that the central tunnel 9 is elevated towards the bulkhead end, and the beam member 1 made bipartite and linked directly to the central tunnel 9. In a simplified embodiment, the half associated with the passenger side might be dispensed with. This might be the case especially if other measures have been taken to realize the safety conception described in DE 3,928,864 A1.

Figure 4:
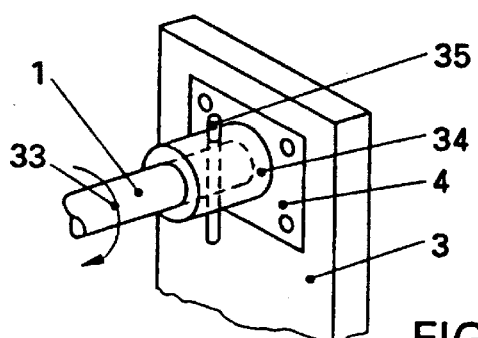
FIG. 4 shows a special articulation of a beam element built according to FIG. 1 to column parts of a vehicle.
Figure 5:
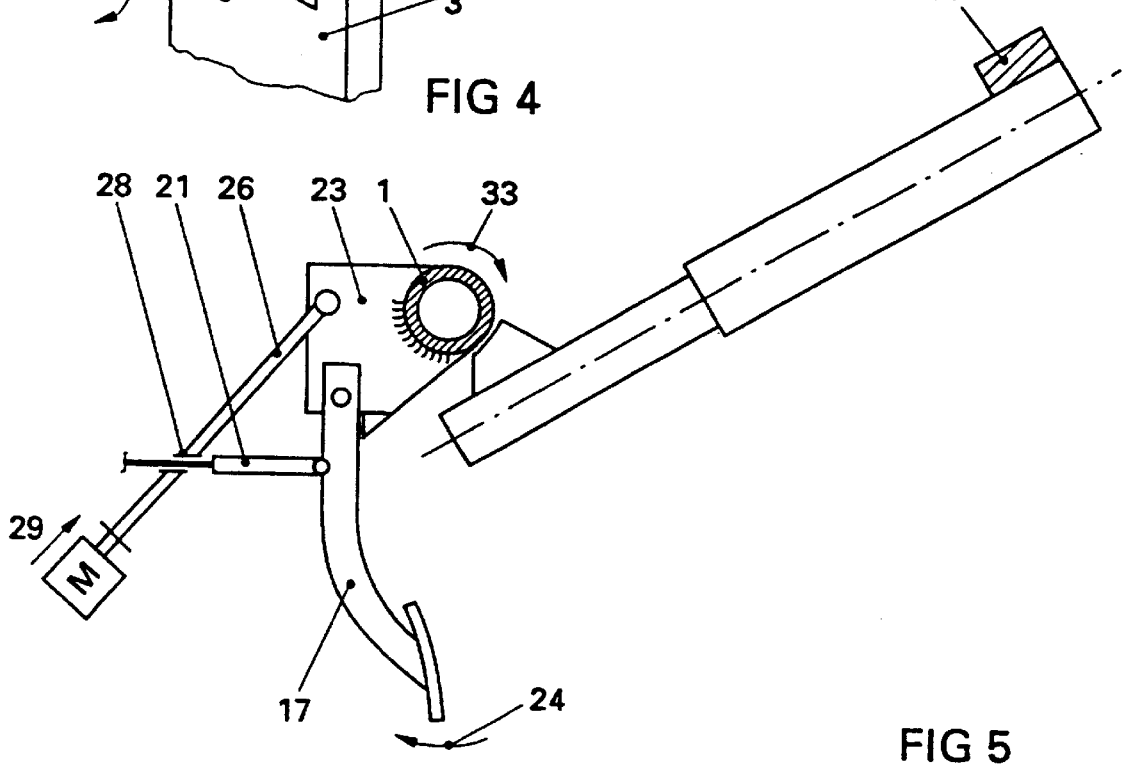
FIG. 5 shows a modification of the embodiment represented by way of example in FIG. 2.

Likewise in the case of the modification represented in FIGS. 4 and 5, a crash-related relative motion of the mass M with respect to the vehicle body in the direction of the arrow 29 will cause a swing of the pedal 17 in the direction of the arrow 24. In addition or alternatively to the embodiment shown in FIG. 2 by way of example, there will here of course be an action by the mass M upon the bearing block 23 through the actuating rod 26, causing the bearing block to rotate in the direction of the arrow 33 to move the pedal 17 in the direction of the arrow 24. To permit a torsion of the beam member 1 according to the arrow 33, the bearings of the beam member 1 at the two A-columns 2 and 3 are rotatable after exceeding a preassigned force. For the example of the A-column 3, this rotatable articulation will now be described in more detail with reference to FIG. 4. The fastening flange 4 here comprises a receptacle sleeve 34 in which the free end of the beam member 1 is inserted. The torsional safety between beam element 1 and sleeve 34 is provided by a shear pin 35, which will fail just when, for example in a head-on collision, the force exerted by the mass M on the actuating rod 26 exceeds a certain preassigned value. considering the elastic torsional behaviour of the beam member 1, the strength of the shear pin 35 is so proportioned that for serious frontal impacts, a torsion of the beam member 1 in the direction of the arrow 33 will always be possible. In this place, it may be noted that instead of shear pins, shear teeth or frictional couplings would be possible. Likewise conceivable is the deliberate incorporation of weak spots in the nature of cross-sectional reductions with a positive geometrical connection between beam member 1 and sleeve 34. The connections between beam element 1 and struts 7, 8 might be made in the same way. The bearing block 23 may be fixed to the beam member 1 by a shear-pin secured connection, to reduce the masses to be rotated in a swing of the pedal to a minimum.

Figure 6:
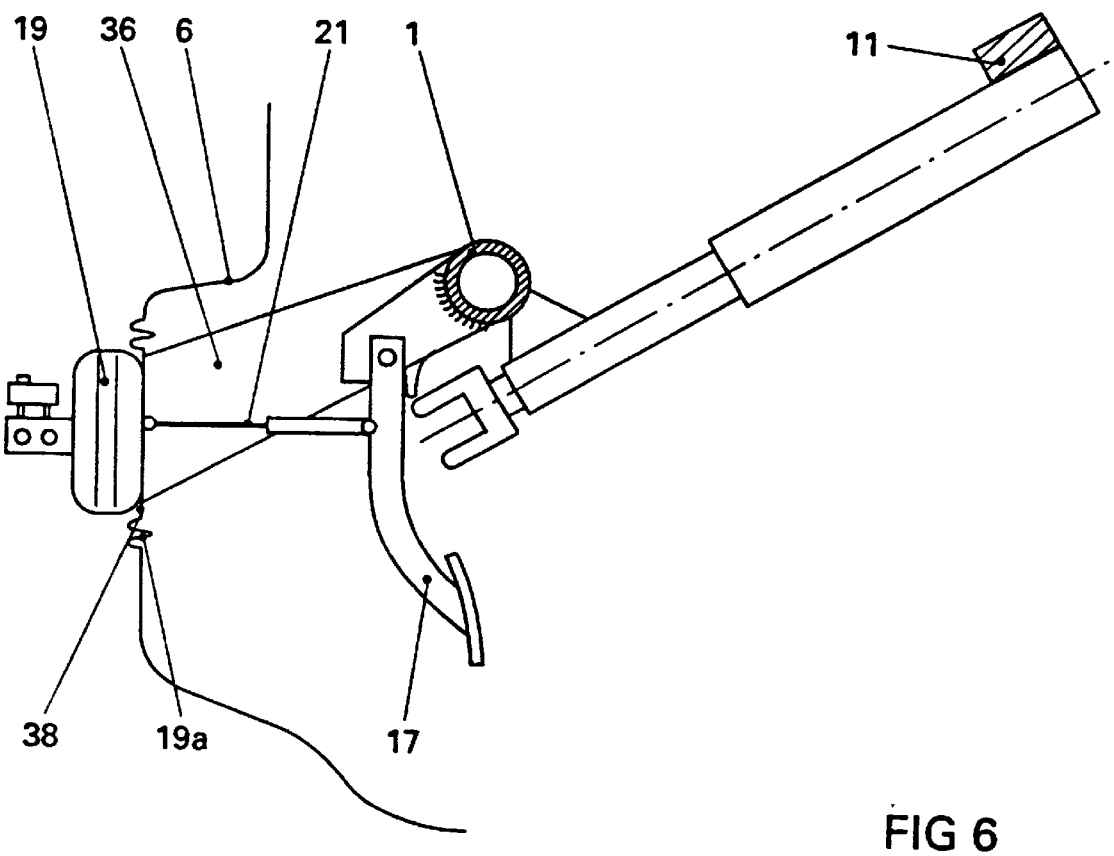
FIG. 6 shows a refinement of the invention in a view comparable to that of FIG. 2.
Figure 7:
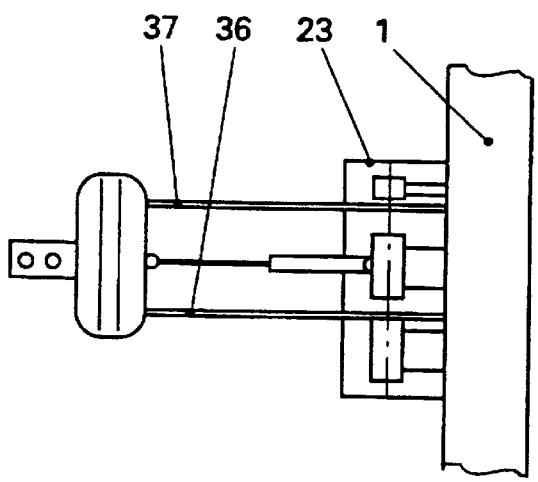
FIG. 7 shows a top view corresponding to FIG. 6, FIG. 8, in a view comparable to FIG. 2, shows the arrangement of a main brake cylinder inside of the passenger compartment.

In the embodiment shown by way of example in FIGS. 6 and 7, the brake force amplifier 19 is uncoupled from the bulkhead. In the case of collision-related intrusion of the bulkhead 6, the brake force amplifier 19 held on the beam member 1 by ribs 36, 37 and an actuating washer 19a (see FIG. 6) will remain in the position shown in the drawing, because the bulkhead 6, owing to an elastic connection with the attachment washer 19a can execute motions relative to the brake force amplifier by way of a rotary diaphragm 38. Then the push rod 21 will not impress any displacement motion on the brake pedal 17. The position of the bearing block 23 relative to the ribs 36 and 37 on the one hand and the transverse member 1 on the other hand will also remain unchanged. The intrusion of the bulkhead 6 is thus rendered entirely independent of the pedals, and consequently cannot lead to a dangerous displacement of the pedals 16 to 18 towards vehicle occupants.

Figure 8:
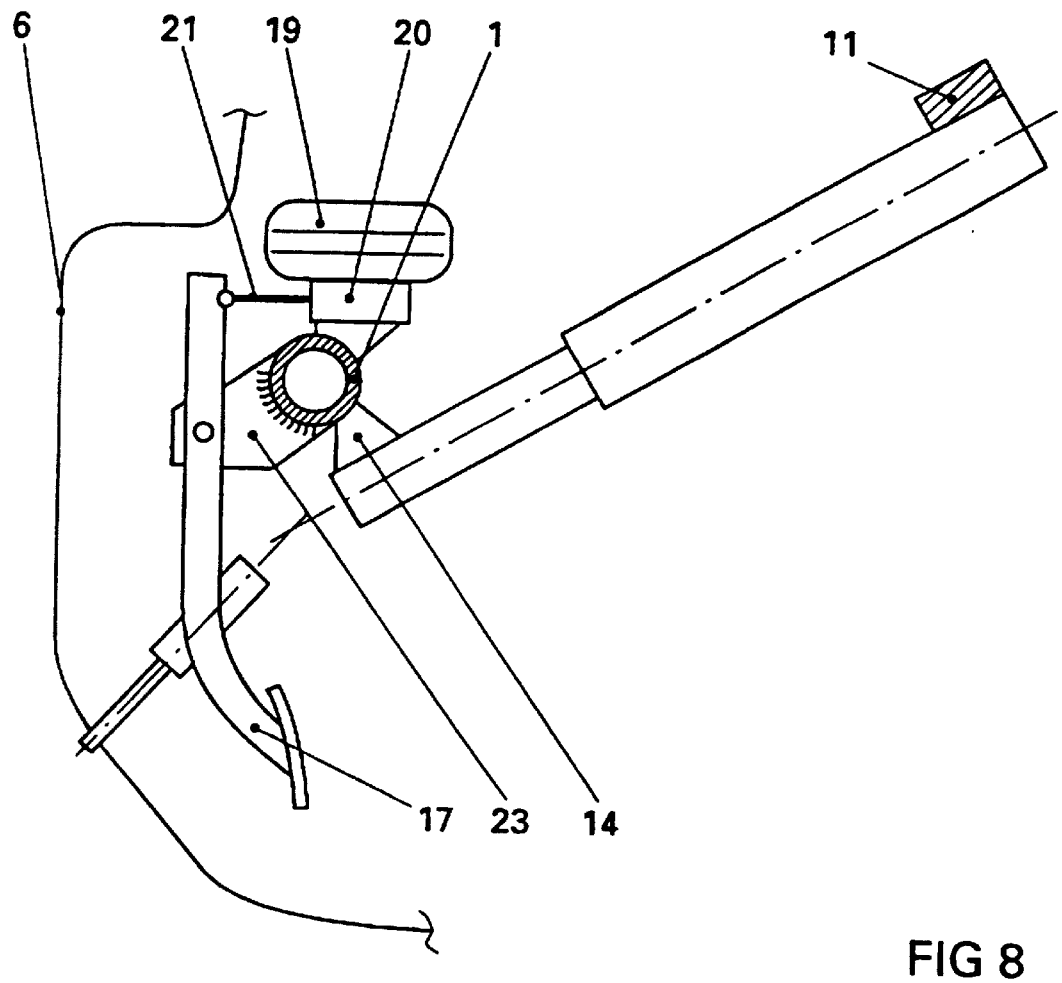

The principle of function in the embodiment shown by way of example in FIG. 8 is similar. Here the brake force amplifier 19 and main brake cylinder 20 are likewise completely uncoupled from the bulkhead. The attachment of these two parts, however, is directly to the beam member 1, to wit in this case for example above the bottom steering column bearing 14. The brake pedal 17 linked to the bearing block 23 transmits the actuating motions not directly into the engine compartment, therefore, but acts in the first instance on the brake system components arranged in the passenger compartment (main brake cylinder 20, push rod 21, brake force amplifier 19. The connection to the brake system of the vehicle is made thence by way of systems of lines known per se through the bulkhead 6. The integration of brake force amplifier 19 and main brake cylinder 20 may expediently be effected within the contour of an instrument panel, so that visually the configuration according to the invention is not noticeable to the occupants.

It should be emphasized as to the embodiment represented by way of example in FIG. 8, that this can be rendered highly installation-friendly, to wit especially so if the beam member 1 and the functional members associated with the pedals and the brake system are combined in a subassembly. Furthermore, the concept illustrated in FIG. 8 is usable in like manner with restriction for right-hand or left-hand steering vehicles. Besides, space is saved in the engine compartment, so that this concept is especially of interest for the development of new compact vehicles. Removal of the main brake cylinder 20 as well as of the brake force booster 19 from the bulkhead 6 is highly advantageous acoustically also.

Figure 9:
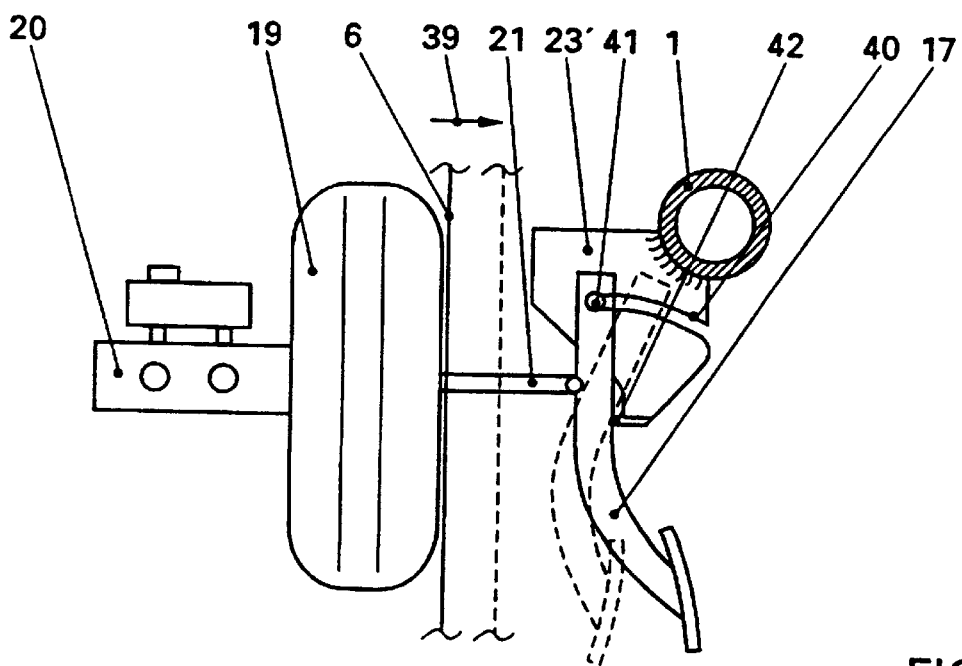
FIG. 9 shows an embodiment in which the pedal swing is obtained from a "collision"-related bulkhead displacement.

The embodiment in FIG. 9 shows how a collision related intrusion of the bulkhead 6 in the direction of the arrow 39 can be converted into a swinging motion of the brake pedal 17. For this purpose, a bearing block 23' is arranged on the beam member 1, mounted stationary, and a slide guide 40 is recessed in it. The clear width of this guide 40 is slightly smaller than the diameter of a link pin 41 by which the brake pedal 17 is suspended. In normal operation, the brake pedal 17 pivots on the pin 41, thus permitting a displacement of the push rod 21 against the direction of the arrow 39. By means of restoring springs not here shown in detail, when the main brake cylinder 20 is not actuated, the brake pedal 17 moves automatically towards a pedal stop 42, being a fixed part of the bearing block 32 and hence likewise stationary in relation to the beam member 1. A displacement of the brake force booster 19 attendant upon the intrusion of the bulkhead 6 into the dotted position makes provision so that above the pedal stop 42, a tilting moment is introduced into the brake pedal 17 as well. This acts upon the lift pin 41 to the effect that the slide guide 40 is widened, making possible a rotation of the brake pedal 17 about the pedal stop 42 even under load. For definite fixation of the pedal stop 42, the open end of the guide 40 may be closed if desired. The length of the slide guide 40 is in any event so dimensioned that a maximal swingability of the brake pedal 17 about the pedal stop 42 is possible. In addition or alternatively to the embodiment shown by way of example in FIG. 9, instead of a slide guide, the use of an elastic element is conceivable, whose resistance to deformation is so proportioned that the link pin 41 is definitely fixed in normal operation, and that upon collision-related intrusion of the bulkhead 6 and hence of the push rod 21, a swing about the pedal stop 42 is possible. As an alternative, a controlled weak spot may be provided in the link pin 41, which gives way when a certain force exerted by the push rod 21 is exceeded, thus no longer preventing a swing about the pedal stop 42.

Figure 10:
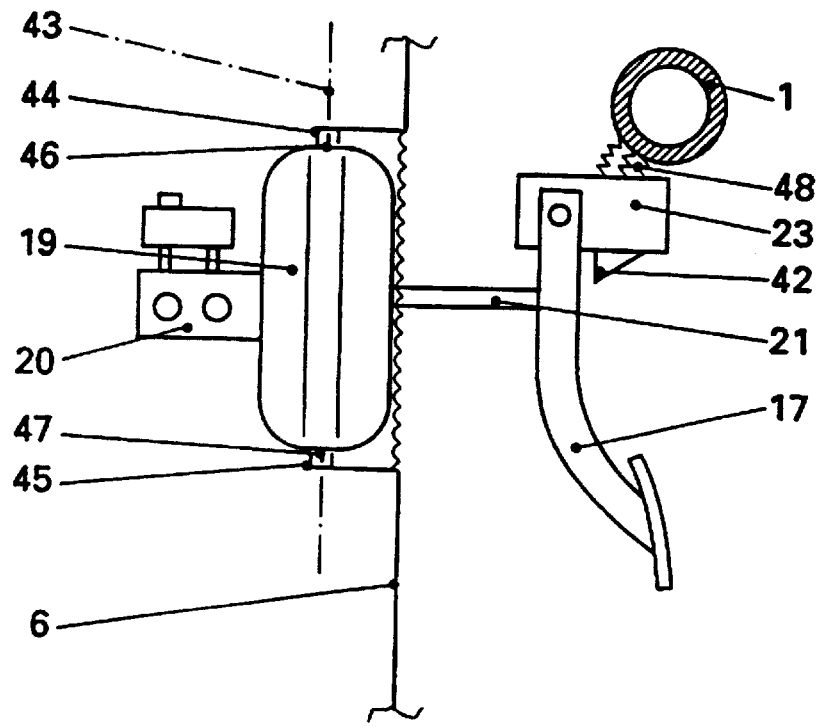
FIG. 10 shows, in a view comparable to FIG. 2, a brake force amplifier pivotable on a vertical axis, initiating a pedal swing upon collision-related displacement.
Figure 11:
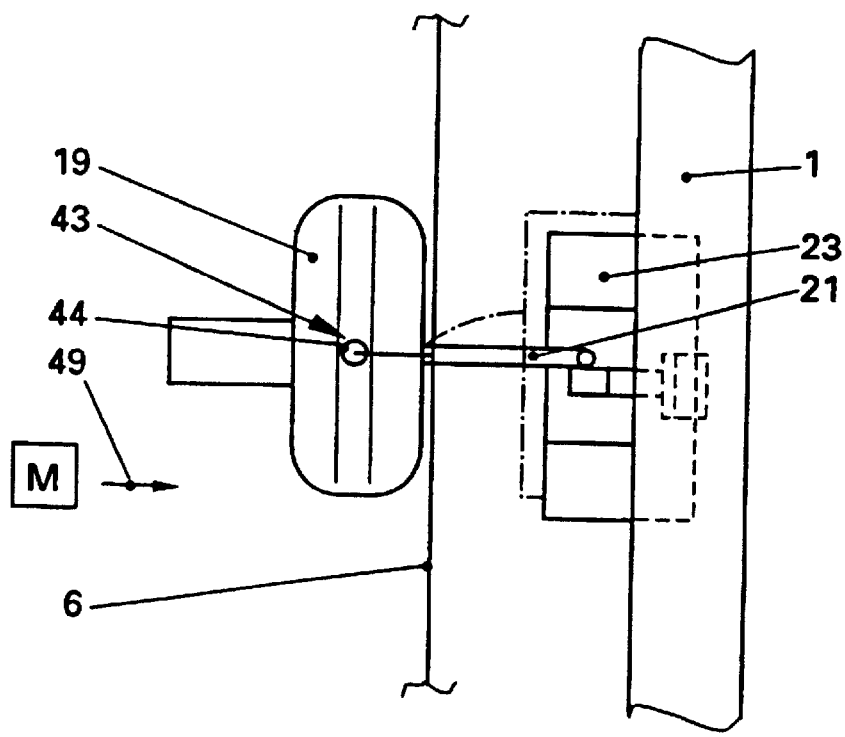
FIG. 11 shows a top view of the arrangement according to FIG. 9, FIG. 12, in a view comparable to FIG. 2, shows a pedal action in which a main brake cylinder is actuable by means of a tension bar.

Another possibility for collision-related dislocation of pedal levers is shown in FIGS. 10 and 11. Of special importance in this arrangement is the collision-related rotatability of the brake force booster 19 with main brake cylinder 20 about a substantially vertical axis 43, here/indicated by a dot-dash line in FIG. 10. To secure this vertical rotatability, points of articulation 44 and 45 provided on the bulkhead 6 are engaged by articulation pins 46, 47, which in turn are held on the housing of the brake force booster, 19. The bearing block 23 is connected by a shear part 48 to the superstructure-fixed beam member 1. The rest position, the brake pedal 17 is in contact with a pedal step 42 associated with the bearing block 23. In addition, FIG. 11 shows a mass M, which in a frontal impact executes a motion relative to the vehicle body and is laterally offset with respect to the vertical axis 43 passing through the housing of the brake force booster 19. In event of an impact upon the brake force booster 19 by the mass M in the direction of the arrow 49, the booster 19 is rotated about the axis 43, leading to a lateral deflection of the push rod 21 into the position shown dotted. The forces applied through the push rod are so great that the shear part 48 will give way, and a forward displacement of the pedal block 23 together with the pedals into the position likewise shown dotted will occur. This removes the pedals both laterally and in the direction toward the bulkhead 6 from the danger zone. Even without any lateral displacement of the pedals, the rotation of the brake force booster 19 may also be utilized to disengage the brake push rod 21 from the articulation to the brake pedal 17. The brake pedal 17 is thereby rendered idle, and so no longer dangerous to the occupants.

The concept illustrated in FIGS. 10 and 11 may also be used in overlapping combination with the embodiments previously described.

Figure 12:
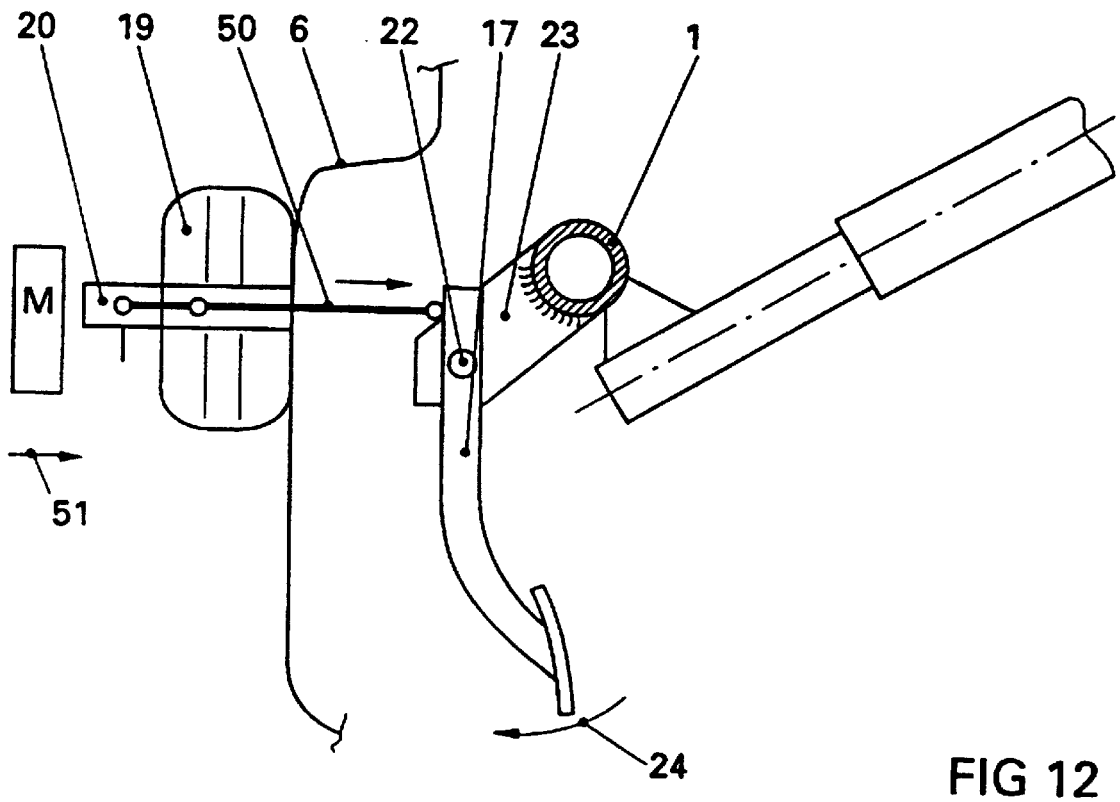
Figure 13:
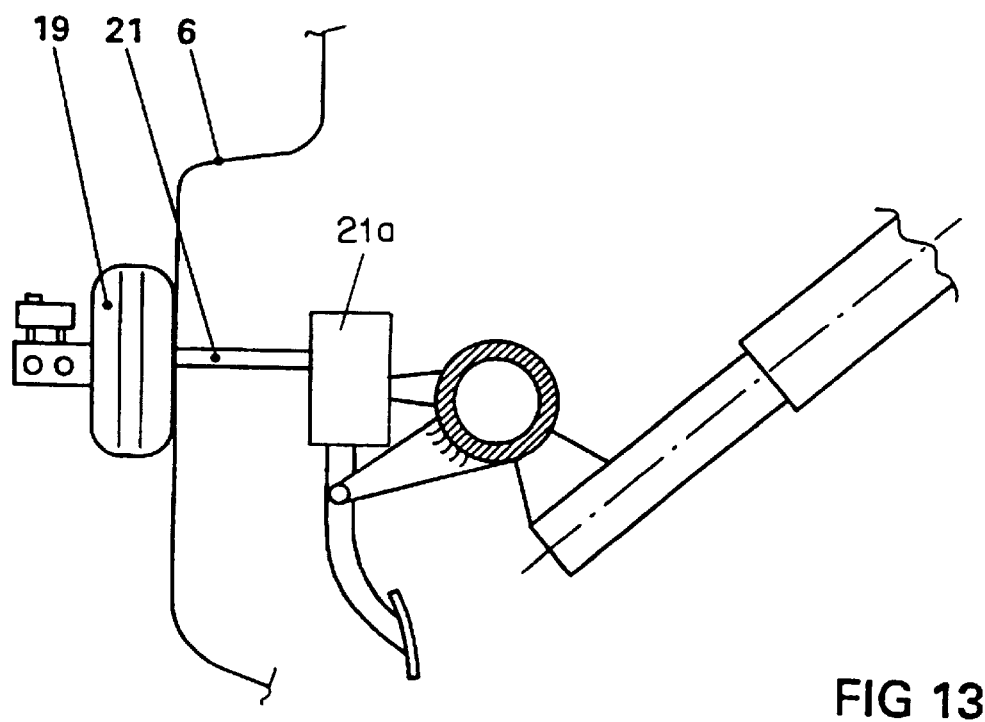
FIG. 13 shows a modification of the arrangement according to FIG. 12.

In the embodiment of FIG. 12, the main brake cylinder 20 is actuated by a tension bar 50 attached to the brake pedal 17 above the point of articulation 22. Such tensile actuations are known in principle in the prior art. The action of the mass M on the brake force booster 19 and main brake cylinder 20 in the direction of the arrow 51, by way of the resulting displacement of the tension bar 50, then leads—alone or in combination with a simultaneous intrusion of the bulkhead 6—to a swing of the brake pedal 17 towards the bulkhead 6 (see arrow 24). This solution is especially of interest for vehicles in which for example the cylinder head of an internal combustion engine is arranged close behind the brake force booster 19. Instead, depending on installation conditions, an actuating block affecting the brake force booster 19 may be provided on a gear casing or engine block not shown here in detail. The actuating block may be molded on beforehand or bolted in place subsequently.

An articulation with the brake pedal 17 above the pivot 22 is also possible with a brake push rod if coupled to the brake pedal 17 indirectly by way of a conventional schematically illustrated lever arrangement 21a mounted on the beam member 1.

Figure 14:
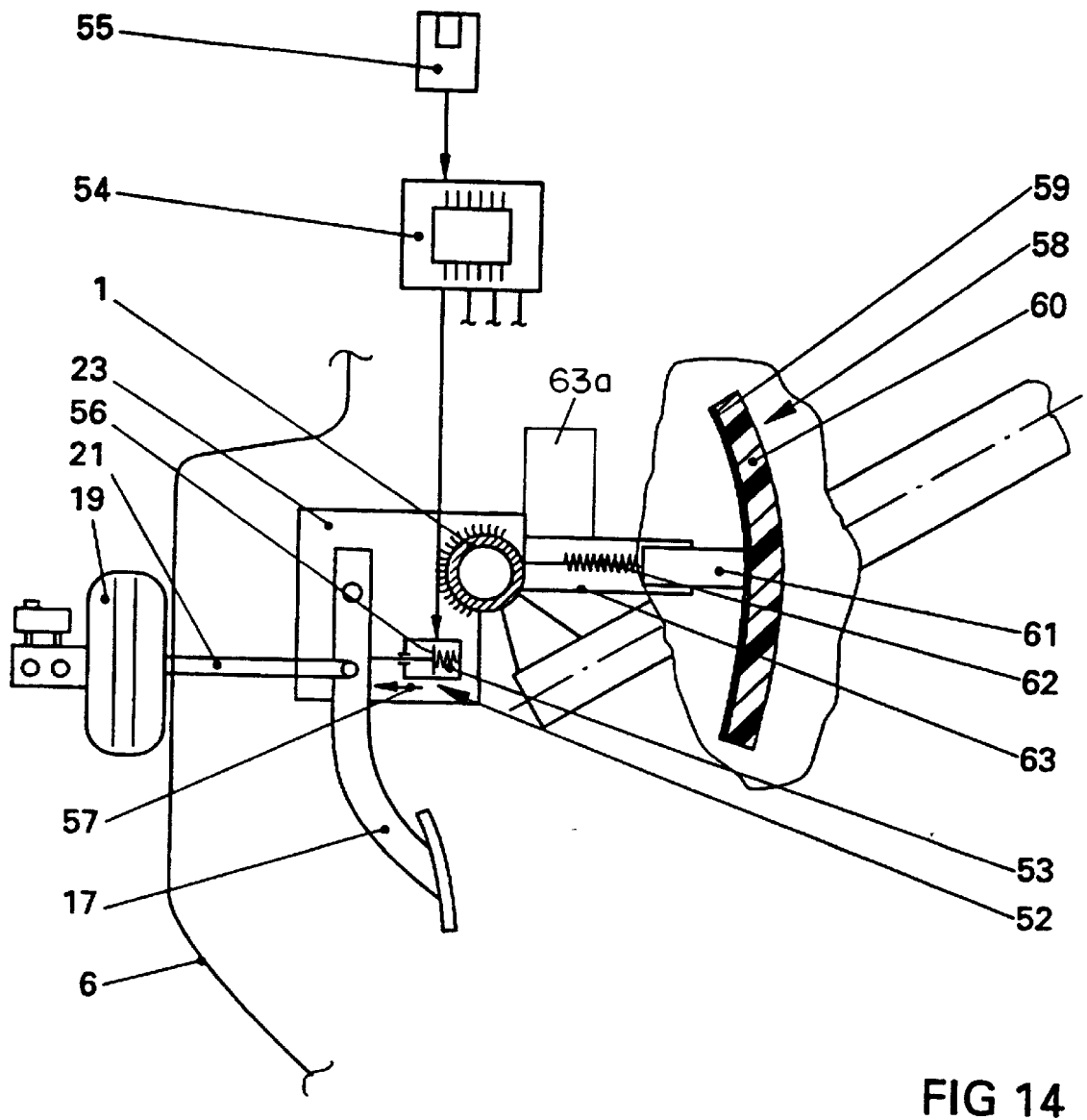
FIG. 14 shows a pedal action with servo drive associated with the pedals, making a pedal swing possible independently of bulkhead intrustion.

A pedal swing with extremely short response time on commencement of an accident makes possible the modification represented in FIG. 14. Here the brake pedal 17 is associated with a servo 52 fixed to the bearing block 23, a servo of pyrotechnical design in this instance. A propulsive charge 53 can be fired by a symbolically represented control 54, acted upon in turn by at least one collision sensor 55. Other output lines, here unnumbered, of the control 54 may for example be connected to various airbags or belt-tightening means, and are generally present in any case on vehicles of recent type. In this way, a conventional safety concept may readily be augmented by a foot-protection component. Alternatively to the embodiment shown by way of example in FIG. 14, the servo may also be used to displace the bearing block 23 relative to the beam member 1. For this purpose, the bearing block 23 should for example be held arrested in a slide guide extending in lengthwise direction of the vehicle. Then upon activation of the crash sensor 55, first the arrest is released, and then the servo triggers the displacement. Instead of a pyrotechnical propulsive charge, spring-actuated, electric motor, hydraulically or pneumatically actuated servos may be provided to move a piston 56 of the servo 52 in the direction of the arrow 57 in order to swing the brake pedal 17. This recommends itself especially when, in the area of the pedal, there are already supply lines for at least one of the forms of energy last mentioned.

Figure 15:
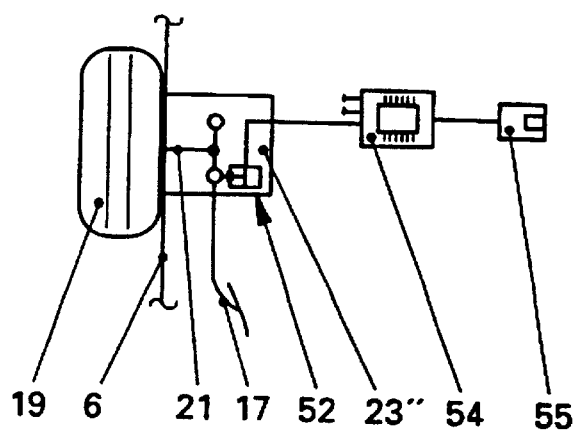
FIG. 15 shows a modification of the embodiment represented by way of example in FIG. 13.

It is important in this connection that the swinging of pedal levers is not confined to servos associated with a nearly immovable beam member. Likewise in the case of bulkhead-side attachment to a bearing block 23 (see FIG. 15), such a servo 52, because of its very short response time, can be very helpful, especially so if the bulkhead intrusion as such is limited to a minimum by appropriate design measures.

As an example of the manifold serviceability of the stationary beam member 1, a torn-out portion of FIG. 14 shows a knee pad 58 with a support plate 59 covered with soft padding 60, preferably by foaming. By way of a guide member 61 and an energy-absorbing, yielding force limiter 62, each associated with a retaining element 63 attached to the beam member 1, the knee impact forces can be transmitted to the flexurally rigid beam member 1 and so directly into the vehicle superstructure. By contrast with the generic prior art, then, the beam member here is not itself deformable, so that independently of knee impact events, the swing of the pedals can be positively controlled kinematically. It is here noted that the representation in FIG. 14 is strictly schematic in nature, individual functions being therefore assigned to separate parts. For simplification in actual practice, however, integration may be introduced. It is advisable, for example, to combine the functional parts 59 and 61 to 63 into a single part.

The remaining element 63 may additionally or alternatively be adapted to the attachment of an airbag arrangement 63*a* which is schematically illustrated in FIG. 14. The latter may accommodate a passenger-side airbag or, according to an especially advantageous modification, a footroom airbag, placing itself protectively over the pedals and serving to displace the lower extremities away from the bulkhead 6 in the direction of the seat.

To summarize, it may be stated that by the uncoupling of the flexurally rigid beam member 1 from the bulkhead 6 according to the invention, manifold opportunities are gained to provide effective protection for the lower extremities of a vehicle occupant. Depending on installation conditions, any number of the measure hereinbefore described may be combined with each other.

What is claimed is:

1. Safety apparatus for a motor vehicle having a passenger compartment for occupants and a vehicle superstructure comprising:
   at least one pedal articulated on a bearing block;
   at least one beam member extending over at least about one-half the width of the vehicle and spaced from a bulkhead bounding the passenger compartment; and
   the beam member rigidly connected to members of the superstructure in such a manner that the relative positions of the beam member and the superstructure members will be nearly unchanged after a vehicular accident compared to the relative positions of those members before the accident;
   wherein the bearing block is rigidly connected to the beam member, so that the beam member and the bearing block, as well as the at least one pedal articulated thereon will be mechanically uncoupled from the bulkhead upon collision-related displacement of the bulkhead.

2. Safety apparatus according to claim 1 including a main brake cylinder attached to the beam member which is capable of being acted upon by a pedal through an actuating linkage.

3. Safety apparatus according to claim 2 including a brake force booster associated with the main brake cylinder attached to the beam member.

4. Safety apparatus according to claim 2 wherein the actuating linkage acting upon the main brake cylinder is a push rod which is articulated at an upper end of the pedal.

5. Safety apparatus according to claim 4 wherein the pedal is capable of being acted upon by a force transmission member, which is displaceable in the event of a collision and is located in front of the bulkhead part, through the tension bar and the main brake cylinder in such manner as to swing in the direction of the bulkhead in the event of a displacement of the force transmission member toward the passenger compartment.

6. Safety apparatus according to claim 1 including a steering column bearing for a steering column attached to the beam member.

7. Safety apparatus according to claim 6 wherein a steering wheel capable of being impacted by the occupant is arranged at an end of the steering column spaced from the steering column bearing and wherein the steering column is supported at least indirectly on the beam in the vicinity of a lower steering column bearing and is capable of telescoping and limiting by energy absorption an impact exerted on the steering wheel in a collision.

8. Safety apparatus according to claim 1 wherein the beam member is supported from a central tunnel of the motor vehicle.

9. Safety apparatus according to claim 1 wherein the beam member is rotatably supported and is held in a preassigned position by releasable retaining elements.

10. Safety apparatus according to claim 9 wherein the retaining elements comprise shear pins capable of being shared off when a preassigned stress is exceeded.

11. Safety apparatus according to claim 1 wherein the pedal is capable of being acted upon by force transmitted by a force transmission member so that it is swingable with a footpad toward the bulkhead upon said collision-related relative displacement of the force transmission member.

12. Safety apparatus according to claim 1 including a brake force booster cooperating with the pedal and wherein the brake force booster is mechanically uncoupled from the bulkhead and is outside of the passenger compartment.

13. Safety apparatus according to claim 12 wherein a fastening washer associated with the brake force booster is attached to a frontal wall end of the bearing block and protrudes into a recess of the frontal wall and is sealed from the recess by an encircling movable diaphragm.

14. Safety apparatus according to claim 1 including a bearing shaft in the bearing block for articulation of the pedal wherein the bearing shaft is swingable out of a rest position about a lower bearing point of the bearing block if a collision force exceeding a preassigned force is exerted on the pedal.

15. Safety apparatus according to claim 14 wherein the bearing shelf is supported in a curved slide guide having a width which is less than a diameter of the shaft.

16. Safety apparatus according to claim 1 wherein a bearing shaft provided for articulation of the pedal to the bearing block is supported by a deformation member supportable at least indirectly against the beam member.

17. Safety apparatus according to claim 1 including a servo connected to an accident sensor means associated with at least one of the bearing block and the at least one pedal, whereby the bearing block and the at least one pedal are movable in the direction of the bulkhead.

18. Safety apparatus according to claim 1 including energy-absorbing yielding knee pads supported on the beam member.

19. Safety apparatus according to claim 1 including fastening means for an airbag arrangement supported from the beam member.

20. Safety apparatus according to claim 1 wherein the beam member is hollow with a closed cross-sectional profile, and at least parts of the beam member are parts of a fluid delivery system.

21. Safety apparatus for a motor vehicle having a passenger compartment for occupants and a vehicle superstructure comprising:
   at least one pedal articulated on a bearing block and connected to a main brake cylinder by way of an actuating linkage;
   at least one beam member extending over about one-half of the width of the vehicle and spaced from a bulkhead the passenger compartment;
   a force transmission member which is displaceable in response to a collision operatively arranged so that the force transmission member is capable of acting upon the actuating linkage to swing or shift the at least one pedal in event of a collision-related displacement of the force transmission member relative to the beam member.

22. Safety apparatus according to claim 21 wherein the bearing block is connected to the beam member by way of a shear member, and is displaceable by force transmitted by the force transmission member and the actuating linkage in an event of accident-related displacement of the force transmission member.

23. Safety apparatus according to claim 22 wherein the pedal is capable of being acted upon by force transmitted by the force transmission member so that it is swingable together with a foot pad toward the bulkhead upon said collision-related displacement.

24. Safety apparatus according to claim 1 or 21 wherein the beam member is attached to columns of the vehicle superstructure that extend substantially vertically.

25. Safety apparatus according to claim 1 or 21 wherein the beam member extending across about one-half the width of the vehicle is attached at one end to one member of the vehicle superstructure and at the other end to a central tunnel.

* * * * *